United States Patent
Schmidt et al.

(10) Patent No.: US 11,518,227 B2
(45) Date of Patent: Dec. 6, 2022

(54) BATTERY BOX WITH REINFORCEMENT ELEMENT

(71) Applicants: Linde + Wiemann SE & Co. KG, Dillenburg (DE); BMW AG, Munich (DE)

(72) Inventors: Werner Schmidt, Alzenau (DE); Alex Zeiser-Rasumak, Marburg-Ockershausen (DE)

(73) Assignees: Linde + Wiemann SE & Co. KG, Dillenburg (DE); BMW AG, Munich (DE)

( * ) Notice: Subject to any disclaimer, the term of this patent is extended or adjusted under 35 U.S.C. 154(b) by 54 days.

(21) Appl. No.: 17/268,627

(22) PCT Filed: Aug. 1, 2019

(86) PCT No.: PCT/EP2019/070799
§ 371 (c)(1),
(2) Date: Feb. 16, 2021

(87) PCT Pub. No.: WO2020/038698
PCT Pub. Date: Feb. 27, 2020

(65) Prior Publication Data
US 2021/0170853 A1    Jun. 10, 2021

(30) Foreign Application Priority Data
Aug. 21, 2018 (DE) .......................... 102018120268.7

(51) Int. Cl.
*B60K 1/04* (2019.01)
*H01M 50/24* (2021.01)
(Continued)

(52) U.S. Cl.
CPC ................ *B60K 1/04* (2013.01); *B62D 21/15* (2013.01); *B62D 25/20* (2013.01); *H01M 50/24* (2021.01);
(Continued)

(58) Field of Classification Search
CPC .. B60K 1/04; B60K 2001/0438; B62D 21/15; B62D 25/20; H01M 50/24; H01M 2220/20; B60Y 2306/01
See application file for complete search history.

(56) References Cited

U.S. PATENT DOCUMENTS

2012/0223113 A1*   9/2012   Gaisne ................. B62D 29/008
                                                                            224/538
2014/0287297 A1   9/2014   Reitzle
(Continued)

FOREIGN PATENT DOCUMENTS

DE    102010056261 A1    6/2012
DE    102011086050 A1    5/2013
(Continued)

*Primary Examiner* — James A English
*Assistant Examiner* — James J Triggs
(74) *Attorney, Agent, or Firm* — Rogowski Law LLC

(57) ABSTRACT

A battery box for a motor vehicle for receiving battery cells has a structural frame with at least two structural components joined to one another at the end face. Each structural component has at least one profile segment that is partially hollow and has a substantially L-shaped cross section. A reinforcement element for absorbing collision energy in the event of a collision is arranged within at least one of the profile segments. The reinforcement element is a molded part having a plurality of open cells, which are arranged adjacent to one another and with their longitudinal extent substantially parallel to one another. When the battery box is mounted in the motor vehicle, the open cells are oriented (Continued)

with their longitudinal extent substantially parallel to the transverse direction of the vehicle.

10 Claims, 5 Drawing Sheets

(51) Int. Cl.
  *B62D 21/15* (2006.01)
  *B62D 25/20* (2006.01)
(52) U.S. Cl.
  CPC ... *B60K 2001/0438* (2013.01); *B60Y 2306/01* (2013.01); *H01M 2220/20* (2013.01)

(56) References Cited

U.S. PATENT DOCUMENTS

| | | | |
|---|---|---|---|
| 2016/0167544 A1* | 6/2016 | Barbat | B62D 21/15 180/68.5 |
| 2017/0263957 A1 | 9/2017 | Minter | |
| 2018/0050607 A1* | 2/2018 | Matecki | B60L 50/66 |

FOREIGN PATENT DOCUMENTS

| | | |
|---|---|---|
| DE | 102014224545 A1 | 6/2016 |
| DE | 102016203890 A1 | 9/2017 |
| DE | 102016115037 A1 | 2/2018 |
| DE | 102016115611 B3 | 2/2018 |

\* cited by examiner

BATTERY BOX WITH REINFORCEMENT ELEMENT

CROSS-REFERENCE TO RELATED APPLICATIONS

This application is a national stage application (under 35 USC § 371) of PCT/EP019/070799, filed Aug. 1, 2019, claiming priority to DE 10 2018 120 268.7, filed Aug. 21, 2018, the contents of each of which are incorporated by reference herein.

BACKGROUND OF THE INVENTION

Technical Field and State of the Art

The invention relates to a battery box with a reinforcement element to absorb energy in case of a collision to minimize damage to battery cells held within the battery box.

Prior-art electric motor vehicles have units that are employed as electric energy storage devices, hereinafter referred to as batteries. These batteries have a modular structure and are often divided into individual, separate cells, hereinafter referred to as battery cells. For example, such battery cells can consist of rechargeable secondary cells which are usually referred to as accumulators. The individual cells of the electric storage device are electrically interconnected to form the so-called battery with the intended operating voltage and energy capacity.

When it comes to large-scale serial production, battery boxes are provided which hold the individual battery cells. Each of the individual battery cells is mechanically joined to the battery box in order to prevent them from slipping during operation. The battery box is especially intended for installation into or mounting onto a motor vehicle, for instance, a passenger car or a truck, especially in the bottom area. On the one hand, the battery box serves as a modular assembly that simplifies the serial production of a vehicle. On the other hand, the battery box protects the battery cells against environmental influences as well as against damage caused by mechanical effects of the type that could occur, for example, in case of an accident.

For instance, the battery cells can be screwed to the battery box inside the latter. For this purpose, it is possible to use connecting elements which are called, among other things, screw nodes, screw points, screw bosses or screw blocks, which can be connected to a baseplate of the battery box. The individual battery cells are then screwed together with the connecting elements.

The baseplate of the battery box also serves to seal the underside of the battery box. As a rule, the baseplate is configured so as to be closed and the above-mentioned connecting elements are joined to the inside of the baseplate.

German patent application DE 10 2016 115 037 A1 discloses a battery box of the generic type for motor vehicle batteries. Numerous requirements are made of such battery boxes. For instance, they primarily have to support the weight of the battery elements, that is to say, battery cells that are normally combined into modules. For this purpose, a sort of side wall or frame is generally provided which serves to attach many components of the battery housing itself and also to attach the battery box directly or indirectly to the body of the motor vehicle.

Such battery elements have to be protected against damage in case of an accident or some other damage to the vehicle. In this context, the battery box serves especially as a barrier for crash loads exerted from the side and from the bottom. Here, the frame can transfer the crash loads into support structures situated inside or below the battery compartment. In case of a side crash, however, the frame should only intrude into the interior of the battery box to the smallest extent possible so that the battery elements do not become damaged.

All in all, the battery box or its frame should take up as little installation space as possible and as few inner support structures as possible should be present inside the housing, which is an objective that is in conflict with the crash requirements.

German patent application DE 10 2016 115 037 A1 discloses a battery box with lateral reinforcement. The battery box has a side wall construction with a box profile which forms an interior area that at least partially forms side walls of the battery box. Moreover, a separate reinforcement structure is provided for the lateral reinforcement of the battery box.

German patent application DE 10 2016 110 335 A1 discloses a battery receptacle having a box which forms an interior area that at least partially forms side walls of the battery receptacle and that has at least a first cover and at least a first base. The battery receptacle also has one or more longitudinal reinforcement elements and one or more crosswise reinforcement elements that form compartments for the battery elements.

German patent application DE 10 2008 059 972 A1 discloses a battery having a plurality of individual cells that are interconnected in series and/or in parallel, and having a cooling plate situated on the individual cells on the pole side. The individual cells are arranged in a battery housing having a housing cover in such a way that a free space is formed between the underside of the individual cells and the base of the battery housing. A plurality of support elements which are each located between and/or under the individual cells protrude into this free space.

German patent application DE 10 2014 224 545 A1 relates to a storage cell modular unit for a motor vehicle having an electric drive and a housing that holds the storage cells. The housing also has an outer longitudinal support member that is configured to absorb a side collision load, especially through the modality of plastic deformation. The storage cells are secured in place by means of a pressure plate that extends essentially in parallel to the longitudinal support member. Moreover, a support element for the longitudinal support member is arranged in a space between the pressure plate and the longitudinal support member, so that the longitudinal support member can be supported on said element in case of plastic deformation of the longitudinal support member.

German patent application DE 10 2014 050 826 A1 discloses an arrangement consisting of at least one traction battery in an electrically powered motor vehicle, whereby the battery is mounted in a battery box at a defined distance from the sills between the axles of the motor vehicle and between side sills that run lengthwise on the undercarriage of the vehicle body. Effective protection of the traction battery in case of a side crash of the motor vehicle is to be achieved in that the battery is additionally protected against damage by means that are effective in case of a side crash.

German patent application DE 10 2013 204 765 A1 discloses a storage cell modular unit for a motor vehicle having an electric drive and a housing in which storage cells are held. The housing also has an energy absorption area that is configured to be deformed in order to absorb energy in case of a collision.

German patent application DE 10 2010 030 535 A1 discloses a motor vehicle with a side sill that has at least an inner shell and an outer shell which are joined to each other on two flanges running in the lengthwise direction of the vehicle and which, between them, enclose a hollow space as seen in the cross section. At least one energy absorber is arranged in the hollow space.

According to German utility model DE 20 2016 107 206 U1, a sill arrangement for a motor vehicle is provided which contains an insert having a recessed honeycomb structure that is intended to reduce the extent of penetration in the direction of a battery pack. In this context, a support is known which has a first plate as well as a second plate that, in conjunction with the first plate, defines a hollow space. An insert with an outer section having a flexural strength S1 adjacent to the first plate is mounted inside the hollow space. The insert also has an inner section having a flexural strength S2 that is greater than S1, whereby the support progressively collapses onto the first plate in response to an impact.

Nowadays, battery boxes of the generic type are usually structured in such a way that they have a frame that is characterized by an L-shape. The horizontal area of the L-leg is normally arranged underneath the vehicle sill, and the fastening points to the sill are located in said area of the L-leg.

In the case of steel rolled profiles, profiles lined up lengthwise with each other each other can be joined to form a profile frame that can thus be optimized to absorb loads in case of a crash. Extruded frame profiles of battery boxes are often provided with ribs that are positioned and dimensioned for absorbing loads. Tight gaps are frequently formed between the partial profiles in such assembled steel profiles. These gaps are susceptible to crevice corrosion.

As mentioned, electric vehicles can be provided with a battery that is attached to the undercarriage, especially between the main tunnel and the sill arrangement on both sides of the vehicle, said battery supplying current to an electric traction motor. These batteries for hybrid electric cars can be damaged by an impact if the impact causes an acceleration peak, especially if the acceleration peak is of a prolonged duration. If the sill arrangement is too rigid, an acceleration of the battery pack caused by a side impact can generate a longer peak of considerable duration and can cause damage to the internal battery connections.

For this reason, structural components can be installed on the motor vehicle which consist of a profile segment that is configured so as to be at least partially hollow and that is attached to the vehicle body by several fastening means. Among other things, these structural components form the part of the crash structures that ensure the stability of the motor vehicle in the case of an accident and that are intended to counter the effects of an impact on components housed in the motor vehicle.

Such structural components are deformed in response to an impact in order to absorb the kinetic energy that acts upon the motor vehicle during the impact in that they transform this energy into deformation work.

When hollow profiles are employed for such structural components, it can happen that the profile collapses when a given load is exceeded and, if further deformation occurs, it can then only perform a small amount of deformation work. Moreover, fastening means that pass through the profile can weaken the structure of the structural component, which is why structural components with fastening elements fundamentally have to be designed with a greater mass. This, however, runs counter to the requirements for lightweight construction in modern motor vehicles.

For this reason, ribs or the like can be provided inside the profiles which then at least partially absorb the kinetic energy that acts upon the motor vehicle during the impact.

When it comes to rolled profiles, which are intended to absorb energy in the crosswise direction, it is a known fact that it is difficult to provide crosswise load paths, for instance, ribs, without generating duplications of material in the lengthwise direction which would, in turn, lead to undesired crevice corrosion.

The term "profile" as set forth here is to be understood in such a way that the profile can be a single-part profile as well as, preferably, a multi-part profile, for example, it can have one or more sections per side of the battery box.

Before the backdrop of the disadvantages described above, the invention is based on the objective of putting forward a battery box for a motor vehicle whose energy absorption capacity in case of a collision has been further improved, while taking into consideration the requirement for a lower weight.

SUMMARY OF THE INVENTION

A battery box for a motor vehicle to receive battery cells has a structural frame with at least two structural components joined together at their ends. Each structural component has at least one profile segment that is partially hollow and that has a substantially L-shaped cross section. At least one reinforcement element for absorbing impact energy in case of impact is arranged inside at least one of the profile segments.

According to an embodiment of the invention, the reinforcement element is a molded part having a plurality of open cells that are arranged adjacent to each other and whose lengthwise extensions are arranged in parallel or substantially in parallel to each other. When the battery box is in its installed state in the motor vehicle, the lengthwise extensions of the open cells are oriented in parallel or substantially in parallel to the crosswise direction of the vehicle body.

These structural reinforcements brought about by the reinforcement elements are suitable to absorb crosswise forces, for example, in case of a side crash such as an impact against a post, in order to prevent the battery cells held in the battery box from being impacted by intrusion. After all, when high forces are exerted, at least some of the forces are absorbed by the reinforcement element. The reinforcement element cannot deflect before it absorbs forces in the crosswise direction of the vehicle. The reinforcement element can preferably completely fill up the hollow space of the battery box, at least in the crosswise direction of the vehicle body, so that a highly effective protection of the battery is ensured in case of an impact.

The reinforcement element effectuates a targeted reinforcement of the structural component which causes the reinforcement element to distribute a local effect of an accident, that is to say, an intrusion, over a greater length of the structural component. In this process, the force introduced by the impact is transmitted to these reinforcement elements so that they are deformed inside the profile segment, thereby exerting additional deformation energy, so that at least part of the impact energy is thus absorbed.

Thanks to the inventive arrangement of the reinforcement element in the profile segment, when the battery box undergoes a deformation in the crosswise direction, that is to say, in the crosswise direction of the vehicle, because of a side impact, for example, impact against a post, the deformation of the battery box is limited to a certain extent so that a deformation of the reinforcement element is promoted and consequently additional collision energy can be dissipated by the compression of the reinforcement element before the profile segment or parts of the battery box penetrate the battery cells. The energy absorption capacity of the battery box can be increased in this manner, without the battery cells in the battery box being damaged in case of a side collision load.

For this reason, according to an embodiment of the invention, a plurality of open cells are arranged adjacent to each other and with their lengthwise extension essentially in parallel to each other, wherein, when the battery box is in its installed state in the motor vehicle, the lengthwise extension of the open cells is oriented essentially in parallel to the crosswise direction of the vehicle body. These open cells have the shortest possible area of contact with the outer walls of the profile. After all, the surface of the requisite joint gap is reduced to the greatest extent possible to the width of the weld plus a joint tolerance, so that undesired crevice corrosion can be prevented to the greatest extent possible.

In case of a side impact, the reinforcement element is deformed in a targeted manner in that the open cells are compressed. This is why the impact energy is absorbed by the cell-shaped network, so that the battery cells are better protected against damage in case of impact. In this manner, a deformation of the reinforcement element does not detrimentally affect the area where the battery cells are located. Therefore, the reinforcement element can dissipate collision energy without damaging the battery cells or the components associated with it.

According to a first advantageous embodiment of the invention, the open cells are configured as honeycomb chambers with a polygonal or hexagonal cross section. Therefore, the honeycomb structure with crosswise chambers is employed in order to minimize the risk of crevice corrosion. Owing to the honeycomb structure, the component has fewer areas that are susceptible to crevice corrosion. Since few gaps are thus formed between the plate sections, the risk of crevice corrosion is diminished in comparison to plate sections that rest on each other over a large surface area.

By virtue of these honeycomb chambers, the reinforcement element displays a relatively low intrinsic weight and, at the same time, can absorb very high forces. The lengthwise extension of the honeycomb chambers essentially matches the crosswise direction of the vehicle. After all, especially in case of a side impact, a high load is exerted on the motor vehicle structure essentially in the crosswise direction of the vehicle. As a result of forces that act in this direction, the reinforcement element or the walls between the individual honeycomb chambers are compressed in the crosswise direction of the vehicle.

The structure of the honeycomb chambers can be configured in such a way that it can be compressed in a targeted manner above a defined limit load. This can be achieved by suitably selecting the size of the honeycombs, the wall thickness between the individual honeycombs and the material employed for the reinforcement element. In this manner, the amount of energy absorbed in this process can also be systematically specified.

In this context, through optimization, it is possible to ascertain a favorable ratio of the size of the crosswise reinforcements (width/height/length) to the wall thickness. This optimization is aimed at utilizing the installation space available in the motor vehicle to the greatest extent possible. Consequently, the high resistance torque of the reinforcement element that can be achieved in this manner allows relatively thinner walls, thus, all in all, optimizing the weight.

Moreover, it is important for the reinforcement elements to be properly attached to the side frame of the battery box so as to form a so-called "crash box". It is likewise important for the structural components to be designed without any unnecessary interruptions such as, for example, holes or pronounced notches that would cause a weakening of the component. This should be taken into account when media conduits such as cables, lines or cooling ducts are laid during the installation.

Advantageously, it can also be provided for the open cells to have a wavy or meandering cross-sectional shape or alternatively to be formed by tubes that are adjacent to each other and oriented essentially in parallel to each other, so that, even in these alternative embodiments, the battery cells are very well protected and, at the same time, the risk of the formation of crevice corrosion is reduced. Open cells configured in this manner are sufficiently stiff and exhibit a relatively low weight in order to bring about the most complete possible deformation of the profile segment with the reinforcement element in the crosswise direction as a result of the compression of the cell-shaped network that takes place in case of a side crash.

Moreover, it can be provided for the reinforcement element to be provided in the horizontal area and/or in the vertical area of the L-shaped profile segment. The crosswise reinforcements can be positioned in the vertical area, in the horizontal area or in both areas of the L-profile. The vertical area of the L-profile constitutes the height of the battery box from the bottom to the cover, while the horizontal area normally accommodates the screw positions to the sill of the vehicle. Of course, with an eye towards achieving an even better absorption of the impact energy, it can also be provided for the open cells to be arranged in the horizontal area as well as in the vertical area of the L-shaped profile segment.

In another advantageous embodiment of the invention, when the battery box is in its installed state in the motor vehicle, the reinforcement element is attached, especially welded, with a positive and/or non-positive fit to the profile segment. This has the advantage that vibrations and resultant noises that occur during regular operation can be successfully reduced or prevented.

According to another variant, the profile segment can be connected to the body of the motor vehicle via fastening means that are especially situated in a fastening section. For instance, the battery cells can be screwed to the battery box inside of the latter. For this purpose, it is possible to use connecting elements which are called, among other things, screw nodes, screw points, screw bosses or screw blocks, which can be connected to a baseplate of the battery box. The individual battery cells are then screwed together with the connecting elements.

Moreover, it can be advantageously provided for fastening points that serve to connect the profile segment to the sill of the motor vehicle to be arranged in the horizontal area of the L-shaped profile segment when the latter is in the installed state. In this manner, the profile segment fulfills a dual function.

According to another advantageous embodiment of the invention, the reinforcement element consists essentially of high-strength cold-worked steel, especially up to a grade of more than 1500 MPa. As a rule, the reinforcement element can be roll-formed or stamped and, if necessary, it can be coated with zinc for corrosion-protection purposes. It can also be provided for the reinforcement element to be melt-hardened. It can also be provided for the reinforcement element to be quench-hardened. It is likewise conceivable for the L-shaped profile segment with a reinforcement element to be manufactured by means of a rolling process, especially in that the rolling direction runs in the direction of the lengthwise extension of the open cells.

Additional objectives, advantages, features and application possibilities of the present invention ensue from the description below of an embodiment making reference to the drawing. In this context, all of the described and/or depicted features, either on their own or in any meaningful combination, constitute the subject matter of the present invention, also irrespective of their compilation in the claims or the claims to which they refer back.

DESCRIPTION OF THE DRAWINGS

The following is shown, in part schematically.

DETAILED DESCRIPTION

Figure 1:
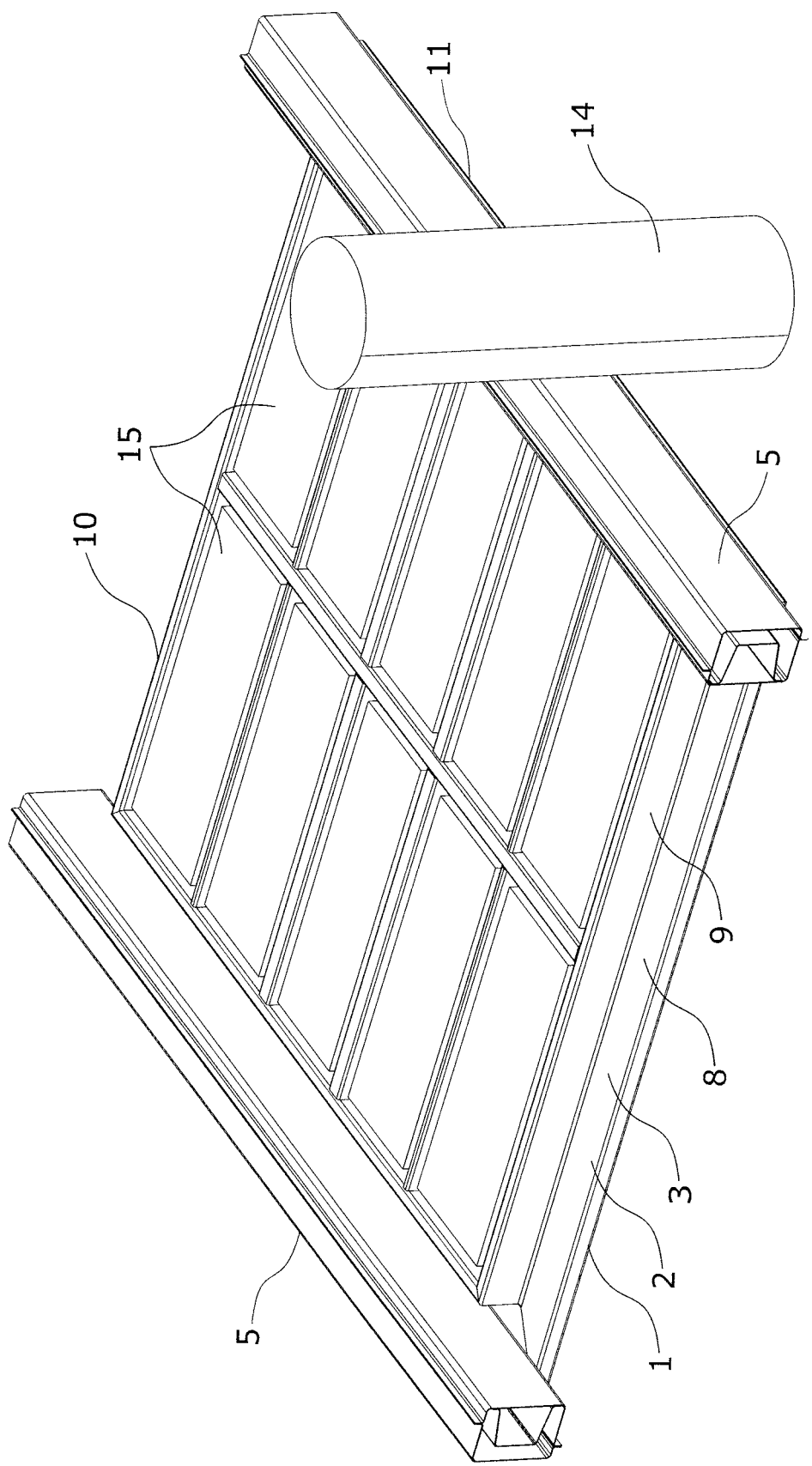
FIG. 1 a battery box in a perspective view with L-shaped profile segments.

For the sake of clarity, identical components or those having the same effect are provided with the same reference numerals in the figures of the drawings shown below, making reference to an embodiment.

FIG. 1 shows a battery box 10 for a motor vehicle to receive battery cells 15. In the present embodiment, a structural frame 1 is formed by two structural components 2 joined together at their ends, whereby each structural component 2 has at least one profile segment 3 that is configured so as to be at least partially hollow and to have an essentially L-shaped cross section 3. Naturally, other profile shapes also fall within the scope of the invention.

As a rule, the battery box 10 is arranged underneath the passenger compartment between the front and rear axles of a motor vehicle having an electric drive. The battery cells 15 serve to store electric energy for the electric drive of the motor vehicle.

Figure 2:
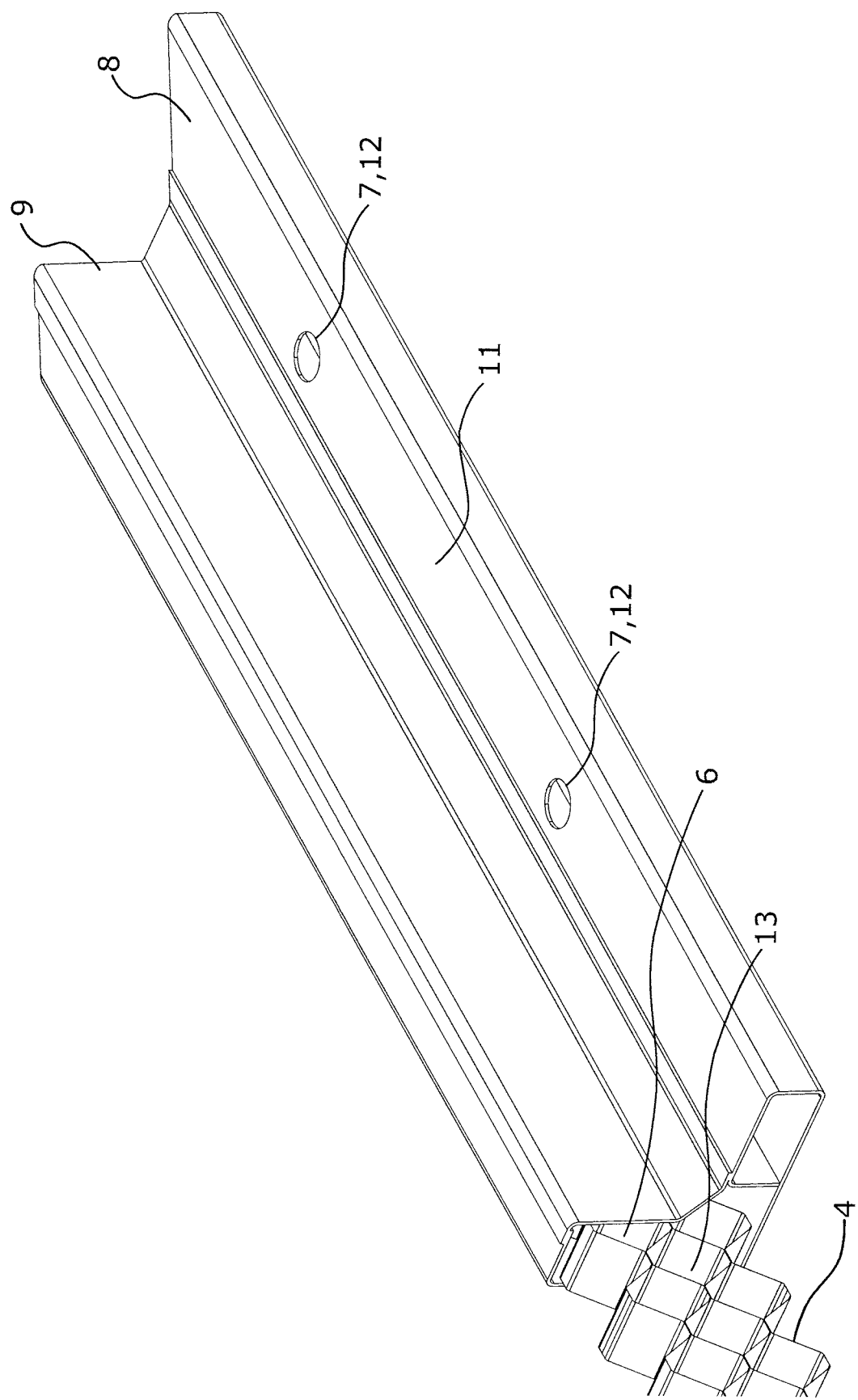
FIG. 2 a perspective view of a profile segment with a reinforcement element in the vertical part of the profile segment, FIG. 3 a side sectional view according to FIG. 2, FIG. 4 a perspective view of a profile segment with a reinforcement element in the horizontal part of the profile segment, and FIG. 5 a side sectional view according to FIG. 4.
Figure 3:
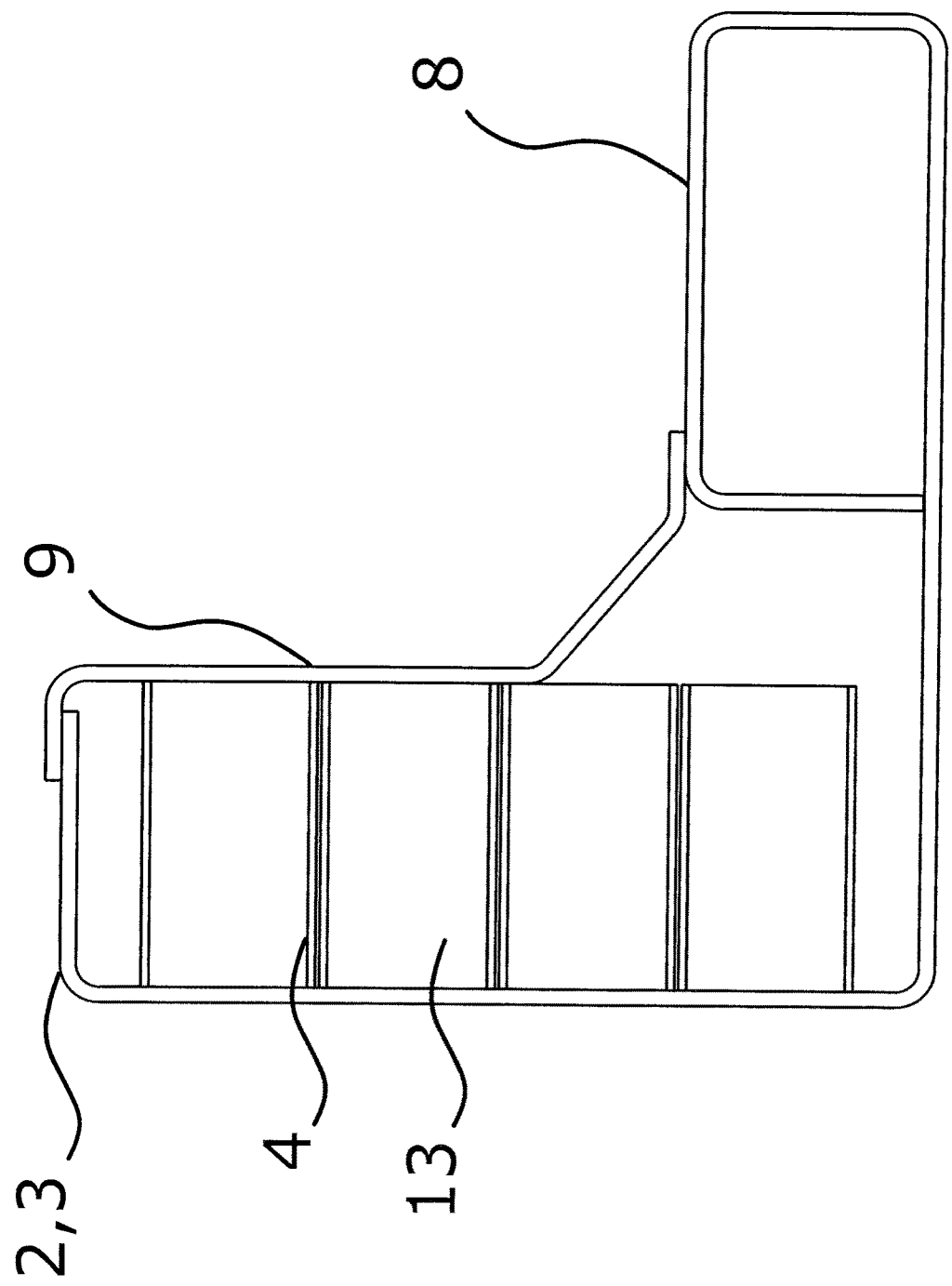
Figure 4:
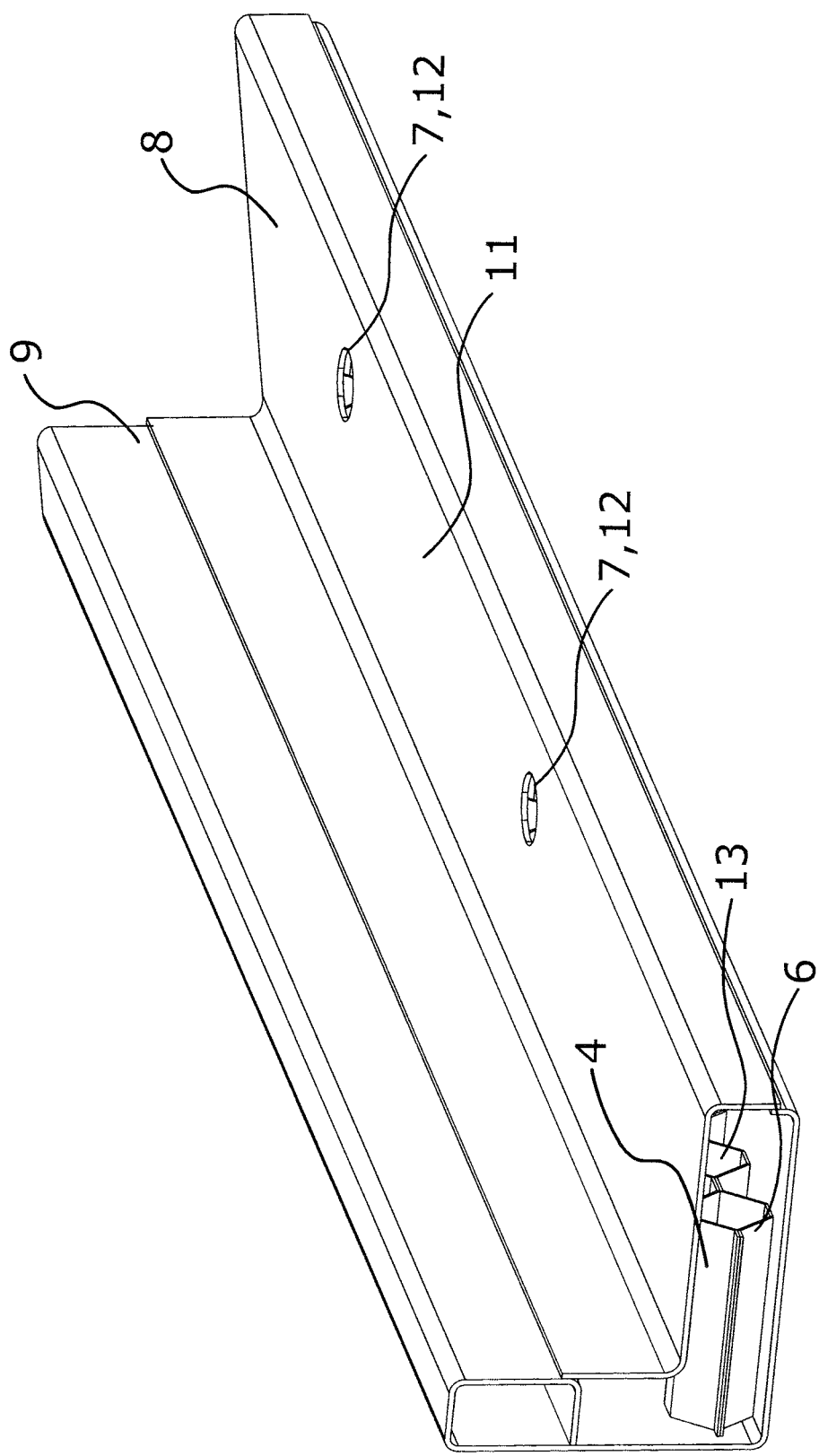
Figure 5:
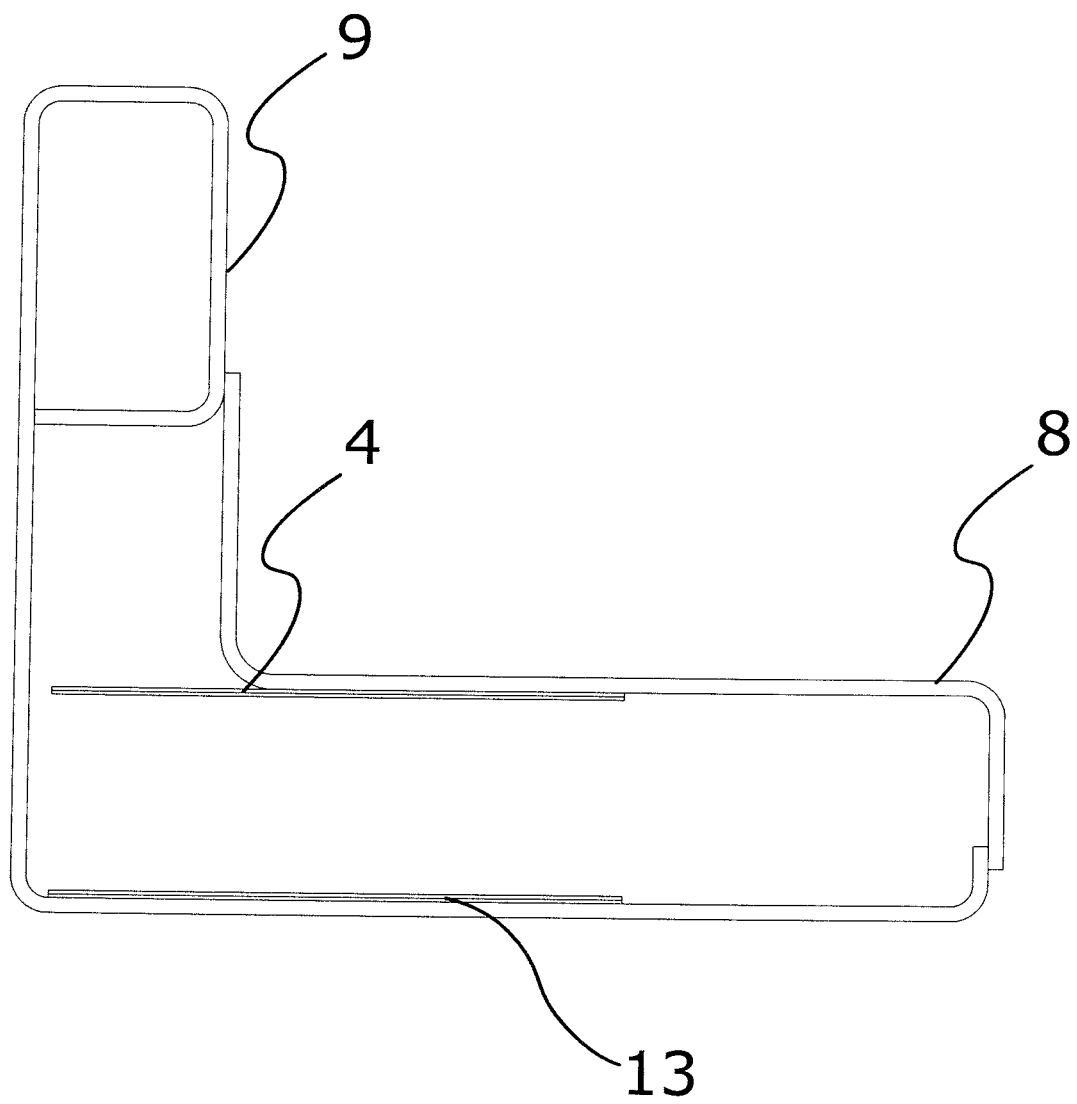

The profile segment 3 has a fastening section 11 so that the structural frame 1 or the battery box 10 can be screwed to the body of the motor vehicle by means of the fastening means 12. Especially the horizontal area 8 of the L-shaped profile segment 3 can serve to fasten the battery 10 to the motor vehicle, particularly in the area of the sill 5 of the motor vehicle. For this purpose, the profile segment 3 can be connected to the motor vehicle body by means of the fastening means 12. As can be seen in FIGS. 1, 2 and 4, fastening points 7 that serve to connect the profile segment 3 to the sill 5 of the motor vehicle are arranged in the horizontal area 8 of the L-shaped profile segment 3 when the latter is in the installed state.

FIG. 1 schematically shows a post test specimen 14 that is intended to symbolize an obstacle for a side impact.

As shown in FIGS. 2 to 5, a reinforcement element 4 that serves to absorb impact energy, especially in the case of a side impact, is arranged inside at least one of the profile segments 3.

It can also be seen in FIGS. 2 and 4 that the reinforcing element 4 is a molded part having a plurality of open cells 13. These open cells 13 are adjacent to each other and their lengthwise extensions are arranged essentially in parallel to each other in the profile segment 3.

According to the embodiment variant shown in FIG. 2, in its installed state, the reinforcement element 4 having the open cells 13 is arranged in the vertical area 9 of the L-shaped profile segment 3. FIG. 4 shows an embodiment in which the open cells 13 are arranged in the horizontal area 8 of the L-shaped profile segment 3. Of course, in order to attain an even better absorption of the impact energy, it can also be provided for the open cells to be arranged in both the horizontal area 8 as well as in the vertical area 9 of the L-shaped profile segment 3.

When the battery box 10 is in its installed state in the motor vehicle, the lengthwise extensions of the open cells 13 are oriented essentially in parallel to the crosswise direction of the vehicle. This is the case when the open cells 13 are arranged in the horizontal area 8 of the profile segment 3 as well as when the open cells 13 are arranged in the vertical area 9 of the profile segment 3, or else, of course, in both areas 8, 9.

According to the present embodiment, the open cells 13 are configured as honeycomb chambers 6 having a polygonal or hexagonal cross section. Owing to the honeycomb structure, the component has fewer areas that are susceptible to crevice corrosion. Since few gaps are thus formed between the plate sections, the risk of crevice corrosion is diminished.

By virtue of these honeycomb chambers 6, the reinforcement element 4 displays a relatively low intrinsic weight and, at the same time, can absorb very high forces. The lengthwise extension of the honeycomb chambers 6 essentially matches the crosswise direction of the vehicle. The structure of the honeycomb chambers 6 is configured in such a way that it can be compressed in a targeted manner above a defined limit load. This can be achieved by suitably selecting the size of the honeycombs, the wall thickness between the individual honeycombs and the material employed for the reinforcement element 4. In this manner, the amount of energy absorbed in this process can also be systematically specified.

In this context, through optimization, it is possible to ascertain a favorable ratio of the size of the crosswise reinforcements (width/height/length) to the wall thickness. An iterative computation process can optimize the configuration of the honeycomb structure in terms of its width, height, length and wall thickness as well as in terms of the outer skin of the L-shaped profile segment. It is likewise conceivable that an optimal solution can be created by prescribing the boundary conditions of individual parameters employing a computer-aided computation process.

In an alternative configuration of the invention (not shown here), it can be provided for the open cells 13 to have a wavy or meandering cross-sectional shape or to be formed by tubes that are adjacent to each other and oriented essentially in parallel to each other.

With an eye towards achieving a particularly strong connection, when the battery box 10 is in its installed state in the motor vehicle, the reinforcement element 4 is attached, especially welded, with a positive and/or non-positive fit to the profile segment 3 in that it is secured to the profile segment 3 by means of a weld.

As an alternative, it can be provided for the reinforcement element 4 to be held by a clamped connection in a clamping area inside the horizontal area 8 and/or inside the vertical area 9 of the L-shaped profile. Combinations of these fastening variants are likewise possible.

In case of an impact, especially a side impact, first of all, the horizontal area 8 of the profile segment is deformed and then, depending on whether the reinforcement element 4 is arranged in the horizontal area 8 or in the vertical area 9 or else in both areas 8, 9, the force that is exerted on the reinforcement element 4 is transmitted to the profile segment 3 practically over the entire length of the battery box 10 in the direction of the lengthwise extension. Due to the distribution of the force, for one thing, the reinforcement element 4 is supported on a plurality of points along the lengthwise direction of the profile segment 3. Moreover, the structural component 1 can likewise be deformed over a larger area of the profile segment 3 along the lengthwise direction since, when the reinforcement element 4 is shifted, several fastening means 12 can be shifted inside the profile segment 3 and can thus perform deformation work.

The function of the reinforcement structure is essentially based on the fact that the reinforcement element 4 in the form of the open cells 13 is supported on the profile segment 3, and this is done there in the horizontal area 8 and/or in the horizontal area 9, so that, as a result, the local impact, for instance, of a post test specimen 14, is distributed over a larger surface area of the structural frame 1. In the case of the intrusion of a post test specimen 14, at least some of the forces would be absorbed by the reinforcement element 4. After all, the reinforcement element 4 cannot deflect before it absorbs forces in the crosswise direction of the vehicle. The reinforcement element 4 can preferably fill up the hollow space of the battery box 10 completely, at least in the crosswise direction of the vehicle.

The reinforcement element 4 effectuates a targeted reinforcement of the structural component 1, which causes the reinforcement element 4 to distribute a local effect of an accident, that is to say, an intrusion, over a greater length of the structural component 1. In this process, the force introduced by the impact is transmitted to these reinforcement elements 4 so that they are deformed inside the profile segment 3, thereby exerting additional deformation energy, so that at least some of the impact energy is absorbed as a result. In other words, in the case of a side impact, the reinforcement element 4 is deformed in a targeted manner in that the open cells 13 are compressed. This is why the impact energy is absorbed by the cell-shaped network, so that the battery cells are better protected against damage in case of impact.

These open cells 3 have the shortest possible area of contact with the outer walls of the profile segment 3. After all, the surface of the requisite joint gap is reduced to the greatest extent possible to the width of the weld plus a joint tolerance, so that undesired crevice corrosion can be prevented to the greatest extent possible.

It goes without saying that the individual features of the variants presented here are interchangeable and can be employed in other embodiments, so that properties of the invention presented here also yield sub-combinations that are encompassed by the scope of the invention.

While not wishing to be bound by a single theory of invention, one underlying notion of the invention consists of the fact that, in order to reinforce the structural profile 1 or the battery box 10, a reinforcement profile in the form of the reinforcement element 4 is provided which can act at the place where an impact occurs. The reinforcement element can be installed in the longitudinal area as well as in the crosswise area of a structural frame 1, and it is primarily made of high-strength steel. The reinforcement element 4 consists essentially of high-strength cold-worked steel, especially up to a grade of more than 1500 MPa. As a rule, the reinforcement element can be roll-formed or stamped and, if necessary, it can be coated with zinc for corrosion-protection purposes. It can also be provided for the reinforcement element 4 to be quench-hardened.

The structural frame 1 can be part of a battery box 10 that is depicted in FIG. 1. In this context, the battery box 10 can have a cover that rests on the structural frame 1 and that is sealed off by means of gasket.

LIST OF REFERENCE NUMERALS

1 structural frame
2 structural component
3 profile segment
4 reinforcement element
5 sill of the vehicle
6 honeycomb chamber
7 fastening point
8 horizontal area of the profile segment
9 vertical area of the profile segment
10 battery box
11 fastening section
12 fastening means
13 open cell
14 post test specimen
15 battery cell

The invention claimed is:

1. A battery box (10) for a motor vehicle to receive battery cells, wherein said motor vehicle has a vehicle body having a lengthwise direction and a crosswise direction, comprising:

a structural frame (1) with at least two structural components (2) joined together at their ends, wherein each structural component (2) has at least one profile segment (3) that is partially hollow and that has a substantially L-shaped cross section;

at least one reinforcement element (4) for absorbing impact energy in case of impact arranged inside at least one of the profile segments (3), wherein the at least one reinforcement element (4) comprises a material selected from the group consisting of: high-strength cold-worked steel, high-strength cold-worked steel having a grade greater than 1500 MPa, and steel that is coated with zinc for corrosion-protection purposes, wherein the at least one reinforcement element (4) is a molded part having a plurality of open cells (13) that are arranged adjacent to each other and with lengthwise extensions thereof arranged substantially in parallel to each other, and wherein when the battery box (10) is installed in the motor vehicle, the lengthwise extensions of the open cells (13) are oriented substantially in parallel to the crosswise direction of the vehicle body.

2. The battery box (10) according to claim 1, wherein the open cells (13) are configured as honeycomb chambers (6) with a polygonal or hexagonal cross section.

3. The battery box (10) according to claim 1, wherein the open cells (13) have a wavy or meandering cross-sectional shape.

4. The battery box (10) according to claim 1, characterized in that the open cells (13) are tubes that are adjacent to each other and oriented substantially in parallel to each other.

5. The battery box (10) according to claim 1 wherein the L-shaped profile segment (3) has a horizontal area (8) and a vertical area (9), and wherein the reinforcement element (4)

is arranged in the horizontal area (8) and/or in the vertical area (9) of the L-shaped profile segment (3).

6. The battery box (10) according to claim 1, wherein the reinforcement element (4) is attached to the profile segment (3) when the battery box (10) is installed in the motor vehicle.

7. The battery box (10) according to claim 1, wherein the profile segment (3) is connected to the vehicle body.

8. The battery box (10) according to claim 7, wherein the profile segment (3) defines fastening points (7) to connect the profile segment (3) to a sill (5) of the motor vehicle, and wherein the fastening points (7) are arranged in the horizontal area (8) of the L-shaped profile segment (3).

9. The battery box (10) according to claim 1, wherein the reinforcement element (4) is quench-hardened.

10. A battery box to house battery cells for a motor vehicle, comprising:
- a structural frame comprising a first profile segment that is partially hollow and having a substantially L-shaped cross section and a second profile segment that is partially hollow and having a substantially L-shaped cross section, with said first profile segment spaced apart from said second profile segment, and arranged so that the battery cells may be disposed between the first profile segment and the second profile segment;
- a first reinforcement element for absorbing impact energy arranged inside the first profile segment, wherein the first reinforcement element comprises a material selected from the group consisting of: high-strength cold-worked steel, high-strength cold-worked steel having a grade greater than 1500 MPa, and steel that is coated with zinc for corrosion-protection purposes, and wherein the first reinforcement element has a first plurality of open cells configured as honeycomb chambers with a polygonal or hexagonal cross section that are arranged adjacent to each other and with lengthwise extensions thereof arranged substantially in parallel to each other; and
- a second reinforcement element for absorbing impact energy arranged inside the second profile segment, wherein the second reinforcement element comprises a material selected from the group consisting of: high-strength cold-worked steel, high-strength cold-worked steel having a grade greater than 1500 MPa, and steel that is coated with zinc for corrosion-protection purposes, and wherein the second reinforcement element has a second plurality of open cells configured as honeycomb chambers with a polygonal or hexagonal cross section that are arranged adjacent to each other and with lengthwise extensions thereof arranged substantially in parallel to each other; and
- wherein the lengthwise extensions of the first plurality of open cells are oriented substantially in parallel to the crosswise direction of the vehicle body of the motor vehicle in which the battery box is installed, and the lengthwise extensions of the second plurality of open cells are oriented substantially in parallel to the crosswise direction of the vehicle body of the motor vehicle in which the battery box is installed.

* * * * *